United States Patent

Groschwitz

[15] 3,636,358

[45] Jan. 18, 1972

[54] INTEGRATED OPTICAL-ELECTRONIC SOLID-STATE SYSTEM HAVING TWO SUPERIMPOSED CIRCUIT PLANES LINKED BY OPTICAL AND/OR ELECTRONIC AND HORIZONTAL AND/OR VERTICAL CONNECTIONS

[72] Inventor: Eberhard Groschwitz, Munich, Germany

[73] Assignee: Siemens Aktiengesellschaft, Berlin and Munich, Germany

[22] Filed: Nov. 26, 1969

[21] Appl. No.: 880,147

[30] Foreign Application Priority Data

Dec. 2, 1968 Germany ......................P 18 12 199.8

[52] U.S. Cl...................250/211 J, 250/83.3 H, 250/217 SS, 317/235 N

[51] Int. Cl...........................................................H01j 39/12

[58] Field of Search .....................250/211 J, 217 SS, 83.3 H; 317/235 N

[56] References Cited

UNITED STATES PATENTS 3,479,517 11/1969 Bray et al..............................317/235

*Primary Examiner*—James W. Lawrence
*Assistant Examiner*—Morton J. Frome
*Attorney*—Curt M. Avery, Arthur E. Wilfond, Herbert L. Lerner and Daniel J. Tick

[57] ABSTRACT

At least two superimposed circuit planes are linked by either optical or electronic and either horizontal or vertical connections for permitting in each of the circuit planes and between the circuit planes horizontal, vertical, optical and electronic communication operations via a matrix. The matrix functions at least partially as a carrier of electrical current paths and optical and electrical elements of the system and has vertical and horizontal recesses formed therein for permitting the penetration of information-carrying light beams in predetermined regions and in predetermined directions. At least one optically conductive member transfers light within and parallel to itself in any desired direction.

38 Claims, 2 Drawing Figures

Figure 1:
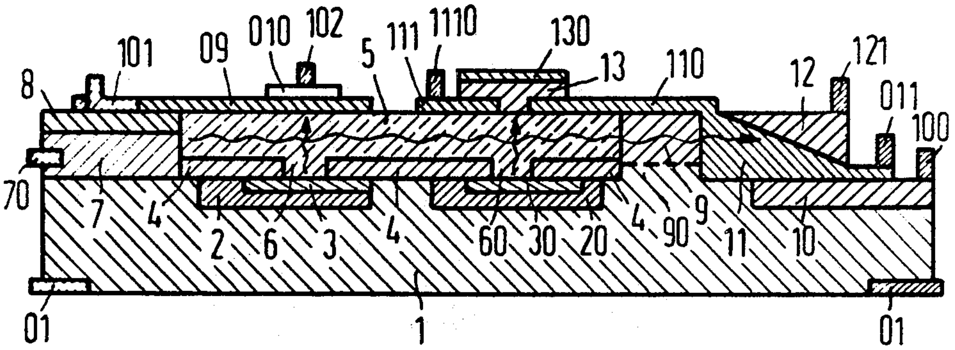

INTEGRATED OPTICAL-ELECTRONIC SOLID-STATE SYSTEM HAVING TWO SUPERIMPOSED CIRCUIT PLANES LINKED BY OPTICAL AND/OR ELECTRONIC AND HORIZONTAL AND/OR VERTICAL CONNECTIONS

The invention relates to an integrated optical-electronic solid-state system. More particularly, the invention relates to an integrated optical-electronic solid-state system for miniaturizing optical-electronic compound systems primarily comprising combined coacting optical-electronic, electrical, optical and photoelectric components.

A compound system of the invention comprises a base crystal which integrates all optical and electronic operations. The base crystal has a surface and a matrix provided at its surface. The matrix defines a spatial integration system which includes the complete system of the desired optical-electronic operations in their complete functions. The matrix comprises two layers which may be exchanged relative to their electronic and optical integrated functions. At least one of the layers of the matrix results from the technological preparation of the surface of the base crystal, and at least another of the layers of the matrix is additionally provided on the original base crystal. At least one of the layers of the matrix integrates the electronic component functions of the compound system, impressing the electrical current paths containing electronic component regions, whereby said layer is functionally subordinated to an optical component system. The optical component system is embedded in at least another layer of the matrix, so that a reciprocal action occurs between the electronic and optical function components of the compound system. The electronic and optical function components of the compound system extend along specified optical paths in at least one layer of the matrix and substantially parallel to the surface of the base crystal in order to provide optical coupling between the optical component systems. The electronic and optical function components of the compound system extend through various regions of the surface of the base crystal perpendicularly to the matrix, in order to provide optical-electronic coupling of the optical component systems and the electronic component systems in accordance with the integration system of the matrix.

The incorporation of the optical operations into an integrated electronic system constitutes, on the one hand, an operation in the range of very high or ultrahigh frequencies and extremely short switching periods, as well as reduced relaxation and delay effects, and, on the other hand, opens a wide field of new electronic embodiments and combinations in such frequency ranges.

An object of the invention is to broaden the communication technique possibilities of an integrated optical-electronic solid-state system by utilizing a three-dimensional system and a corresponding coordination of optical-electronic operations.

In an integrated optical-electronic solid-state system of the aforedescribed type, the problem is solved, in accordance with the invention, by the utilization of at least two superimposed circuit planes. The circuit planes are linked by optical or electronic horizontal or vertical connections whereby electronic communication operations may be provided in each circuit plane as well as between the circuit planes. This is accomplished with the assistance of a matrix which functions, at least partly, as a carrier of electrical current paths as well as optical and electrical components of the system. A plurality of vertical and horizontal recesses are formed in the matrix and transfer information-carrying light beams at predetermined locations in specified directions. At least one optically conductive member is provided for transferring light within and parallel to said member in any desired direction.

An original base crystal integrates all the optical and electronic operations and constitutes the compound system. The base crystal is preferably a semiconductor monocrystal. The principal advantage of the solid-state system of the invention is its use in a three-dimensional integrated system for optical-electronic operations with graduated functions. The possibilities of the optical-electronic operations may be useful in cybernetics, for example.

In accordance with the invention, an integrated optical-electronic solid-state system miniaturizes optical-electronic compound systems comprising combined coacting optical-electronic, electrical, optical and photoelectric components. A compound system comprises a base crystal for integrating optical and electronic operations. The base crystal has a surface. A matrix is provided on the surface of the base crystal and defines a spatial integration system and contains the complete function of desired optical-electronic operations. The matrix comprises at least two layers exchangeable with regard to their optical and electronic functions. At least one of the layers of the matrix is provided at the surface of the base crystal. Another of the layers of the matrix is additionally provided on the surface of the base crystal. At least one layer of the matrix integrates the electronic partial functions of the compound system, impressing electrical current paths and including electronic compound regions, optical component systems and electronic component systems. At least another layer of the matrix has the optical component systems embedded therein. The one layer of the matrix is functionally subordinated in its cross section to the optical component systems in a manner which produces a reciprocal action between the electronic and optical function elements of the compound system which extend along specific paths and substantially parallel to the surface of the base crystal in at least one of the layers of the matrix in order to provide an optical coupling between the optical component systems. The optical function elements extend through specific regions of the surface of the base crystal perpendicularly to the matrix in order to produce optical-electronic coupling of the optical component systems with the electronic component systems in accordance with the integration system of the matrix.

In accordance with the invention, the integrated optical and electronic solid-state system comprises at least two superimposed circuit planes linked by one of optical and electronic and one of horizontal and vertical connections for permitting in each of the circuit planes and between the circuit planes horizontal, vertical, optical and electronic communication operations via a matrix. The matrix functions at least partially as a carrier of electrical current paths and optical and electrical elements of the system. The matrix has vertical and horizontal recesses formed therein for permitting the penetration of information-carrying light beams in predetermined regions and in predetermined directions. At least one optically conductive member transfers light within and parallel to said member in any desired direction.

The crystal is a monocrystal and integrates all optical and electronic operations.

An integrated electrical current bridge having photoelectrically controllable conductivity selectively provides electrical interruptions and connections. The bridge has variable controllable electrical resistance.

A pair of integrated ohmic current paths have a space therebetween. The integrated electrical current bridge comprises sensitively reacting photoelectric material having photoelectrically controllable conductivity for bridging the space between the current paths and selectively providing electrical interruptions and connections. The optically conductive member has horizontal and vertical optically conductive paths. One of the optically conductive paths ends in the space between the current paths so that light current from the optically conductive path may penetrate the photoelectric material of the electrical current bridge.

At least one integrated surface layer phototransistor is provided. The phototransistor substantially comprises three layers having ground boundaries with defined optical refractory qualities. The phototransistor has a horizontal semiconducting base layer forming part of the base crystal. The base layer is applied as a foreign layer to the base crystal. The phototransistor has an intermediate layer on the base layer and having a photoelectric effect. The intermediate layer has a small angle of inclination forming a transparent optical wedge and extending as an optical conductor path along the system.

The phototransistor also has a semiconducting upper layer on the upper surface of the intermediate layer.

The phototransistor is novel in the linkage of the photoelectrically responsive optical wedge and the electrically variable space charge regions which are coupled to be optically controlled and which overlap in wedge shape along the boundaries of the intermediate layer and the adjacent layers of the phototransistor.

The optically conductive member comprises a material having a higher index of refraction than the surrounding material whereby an information-carrying light beam in the optically conductive member remains parallel to the surface of the base crystal.

The base crystal has a lateral boundary. The optically conductive member at least partly comprises optical material for causing an information-carrying light beam to penetrate the lateral boundary of the base crystal at predetermined points and for causing information-carrying light beams to cross the base crystal. The optically conductive member may comprise glass, a glasslike substance or a monocrystalline material. The optically conductive member may be a layer of foreign material provided on the base crystal or may be in the base crystal.

The optically conductive member may be colored in its interior or may be colored at a surface thereof. The optically conductive member is at least partly a component of the base crystal. The optically conductive member is coated with at least partly reflecting thin layers which provide optical paths in the optically conductive member at the surface of the optically conductive member and at least a lateral edge of the optically conductive member and determine the inputs and outputs of the optically conductive member.

The optically conductive member may be coated with fluorescent thin layers or transparent thin layers which provide optical paths in the optically conductive member at the surface of the optically conductive member and at least a lateral edge of the optically conductive member and determine the inputs and outputs of the optically conductive member.

The optically conductive member has a spatially variable distribution of the refractory index. The optically conductive member is double refracting and polarizing. The optically conductive member comprises at least two adjacent component regions having variable optical characteristics. The optically conductive member at least partly comprises optically stimulated laser-active material.

The matrix comprises substantially nonconductive material nontransparent to light beams in the integrated system. The recesses formed in the matrix are filled with transparent material. The transparent material may be at least partly of other elements of the integrated system. The matrix comprises the principal spatial and material portion of the integrated system. A plurality of base crystals are mounted adjacent each other in or on the matrix.

The optically conductive member provides at least one optically conductive path having a controllable index of refraction for regulating a light beam crossing such path.

The optically conductive member at least partially comprises optically stimulated laser-active material. In order to control information-carrying light beams by other light beams of the optically conductive member, the controlling and controlled light beams are intersected in the stimulated portion of the optically conductive path or are joined therewith. In this manner, for example, the optical control of stimulation within the framework of the integrated optical-electronic operations may be utilized in the optical frequency range.

The optically conductive path has a controllable refractory index for regulating the light current passing therethrough. The optical transparency and the cross section of the optically conductive path are controlled by a PN-junction having a junction area extending to said optically conductive path parallel to the longitudinal direction thereof and to the direction of propagation of the light beam. The transparency, the cross section and the spectral distribution of the light beam are controlled in the optically conductive path by biasing the PN-junction with a forward or blocking voltage. The applied biasing voltage may be a direct voltage or an alternating voltage, but preferably comprises a direct and an alternating voltage in superimposed relation. The electrical control members for the controllable optically conductive path are preferably a plurality of electrical current paths of N- or P-conductivity type. The electrical current paths are diffused or alloyed into the original base crystal, for example, or into a specific layer of the integrated system. The PN-junction in a controllable optically conductive path may preferably define a variable material inserted in said path. If the optically conductive path comprises a transparent crystalline material other than glass, however, the PN-junction is preferably produced by appropriate doping of said crystalline material.

Figure 2:
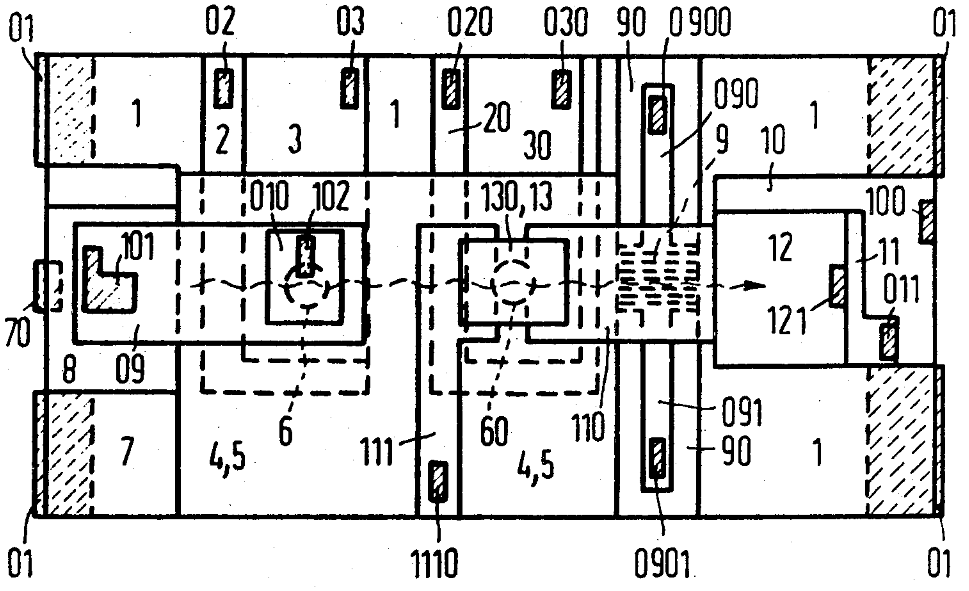

In order that the invention may be readily carried into effect, it will now be described with reference to the accompanying drawing, wherein:

FIG. 1 is a cross-sectional view of an embodiment of the integrated optical-electronic solid-state system of the invention; and FIG. 2 is a top view of an embodiment of the integrated optical-electronic solid-state system of the invention.

In the FIGS., the same components are identified by the same reference numerals. The illustrated example is representative of a number of similar examples which may be realized in numerous modifications, in accordance with the principle of the invention, of a three-dimensional miniaturized integrated optical-electronic solid-state system, relative to the function components included therein.

In the view of FIG. 2, the integrated optical-electronic solid-state system is presented in a manner as if all the components thereof are transparent. Thus, details of superimposed layers are occasionally coincident in the same cross-sectional planes.

In the FIGS., a semiconductor base crystal 1 of the integrated system has an electrical conductivity which is lower than usual and which determines an electrical base potential. The base crystal 1 has at least one electrode 01 of any suitable structure. A pair of planar luminescence diodes 2, 3 and 20, 30 are provided at the intermediate portion of the integrated system. The planar luminescence diode 2, 3 comprises layers 2 and 3 and the planar luminescence diode 20, 30 comprises layers 20 and 30.

The layers 2 and 3 of the luminescence diode 2, 3 are provided with metal contacts 02 and 03, respectively, as shown in FIG. 2. The layers 20 and 30 of the luminescence diode 20, 30 are provided with metal contacts 020 and 030, respectively, as shown in FIG. 2. Voltages are applied to the metal contacts 02, 03, 020 and 030 in order to adjust and control the desired emissivity of the planar luminescence diodes 2, 3 and 20, 30.

The base crystal 1 is provided in its central area with a layer 4 which functions as a matrix. An optically conductive member 5 is positioned above the matrix 4. The matrix 4 includes above the pair of planar luminescence diodes 2, 3 and 20, 30, cylindrical openings 6 and 60 for passing the luminescence beam of said luminescence diodes perpendicularly to the surface of the crystal 1 and crossing the optically conductive member 5. The luminescence beam of the planar luminescence diode 2, 3 impinges upon a photodiode 09, 010 after crossing the optically conductive member 5. The photodiode 09, 010 comprises a pair of semiconductor layers 09 and 010, an electrical contact or electrode 101 connected to the layer 09 and an electrical contact or electrode 102 connected to the layer 010.

The photodiode 09, 010 functions electronically as an additional stray influence upon the injection condition or ratio of the luminescence diode or laser diode provided at the left end of the integrated system and comprising a semiconductor layer 8 of N-conductivity type, a semiconductor layer 7 of P-conductivity type, an electrode 70 in electrical contact with the layer 7 and the electrode 101 in electrical contact with the layer 8. The radiation emitted by the luminescence diode or laser diode penetrates the optically conductive member 5 in a direction substantially parallel to the surface of the base crystal 1, so that the light beams of the planar luminescence diodes 2, 3 and 20, 30, which extend substantially perpendicularly to said surface, are intersected in said optically conductive member by said radiation in the areas above the cylindrical recesses 6 and 60 of the matrix 4.

The intersection of the radiation and light beams in the optically conductive member 5 is of importance in the further development of the functions of said optically conductive member, since it permits the direction of a preferably coherent light beam directly through another light beam, with regard to information, provided the material of said optically conductive member is stimulated in the spatial region of the mutual penetration of the light beams. Thus, the material is induced by the light beams or by a material-dependent coupling. The material of the optically conductive member 5 may have optical qualities which may be modified by the straying light beam itself, to permit modulation of the second light beam.

The light beam of the luminescence diode 09, 010 or the laser diode 7, 8 crosses the optically conductive member 5 substantially parallel to the surface of the base crystal 1 and arrives, at the end of said optically conductive member, at a controlled optically conductive path 9. The controlled optically conductive path 9 couples the end of the optically conductive member 5 with an intermediate layer 11 of an integrated surface layer phototransistor. The intermediate layer 11 is a fine optical wedge. The phototransistor includes a base layer 10 and an upper layer 12, in addition to the intermediate layer 11.

A metal electrode 100 is in electrical contact with the base layer 10 of the phototransistor. A metal electrode 121 is in electrical contact with the upper layer 12 of the phototransistor. An electrode 011 is in electrical contact with the intermediate layer 11 of the phototransistor. The wedge-shaped intermediate layer 11 of the phototransistor has a photoelectric effect and extends at its left end into a conductive layer 110. An electrode or contact 1110 is in electrical contact with the conductive layer extension 110 of the intermediate layer 11. The electrically controlled current paths 111 and 110 are linked by a photoelectrically controlled electrical current bridge 13. The conductivity of the bridge 13 may be sensitively controlled by the current path of the planar luminescence diode 20, 30.

The outer surface of the current bridge 13 is protected from the environment by a nontransparent or opaque layer 130. The controlled optically conductive path 9 penetrates an area 90 of the base crystal. The controlled optically conductive path 9 at least partially comprises a PN-junction in the area 90 of the base crystal 1. The area 90 of the base crystal 1 functions as a crystal bridge between the optically conductive member 5 and the wedge-shaped intermediate layer 11 of the phototransistor. The boundary of the PN-junction extends longitudinally to the middle of the optically conductive path 9.

The variable cross-sectional area of the optically conductive path 9 is illustrated, in FIG. 2, by lines extending in the direction of propagation of the light. The PN-junction has a first extending portion 090 extending from one side thereof (FIG. 2) and a second extending portion 091 extending from the other side thereof (FIG. 2). Each of the extending portions 090 and 091 of the PN-junction are elongated and each extends from the crystal area 90. Each of the elongated extending portions 090 and 091 comprises material of either P-conductivity type or N-conductivity type and provides an ohmic current conducting path. A metal contact or electrode 0900 is in electrical contact with the extending portion 090. A metal contact or electrode 0901 is in electrical contact with the extending portion 091.

If the total electronic concept of the illustrated example of a preferred embodiment of my invention is examined, the following basic electronic system may be recognized. This system may be modified in all details of its execution. In the illustrated embodiment, the integrated solid-state system is provided with stages. Integrated electrical circuits are installed in each stage for the electronic control of optical operations of the respective functional elements within the integrated circuits. These optical operations function to process and transmit information contents, first in vertical direction between two stages of the electronic circuit and, second, in horizontal direction between preferred input and output components of the integrated system. Although the preferred input and output components of the integrated system are not a part of either of the two stages, they produce a principal communication axis of the system having controllable transmission qualities with respect to the information content being transferred between them. The integrated system of the invention has a plurality of electrical inputs in a graduated functional order, and has at least one principal information channel which is supplied with information by the inputs, with modified feedback operations of selectable control functions. The integrated system obviously is of an optical-electronic function design which permits the control of outwardly adjustable internal automatic information exchange effects within the range of extremely high communication frequencies and ultrahigh frequencies.

In accordance with the invention, information contents in light beams are strayed by means of other light beams in accordance with which the information modification may be directly effected within the range of optical frequencies. These circumstances, in connection with an upwardly graduated operational system of self-controlling automatic partial processes, indicate that integrated systems of the type of the invention have possibilities for novel electronic usage such as, for example, in cybernetics. Furthermore, it is possible to process a considerably greater volume of information in integrated solid-state systems, particularly by utilizing, at least partially, coherent light beams as information-carrying media, in the system of the invention rather than in conventionally integrated systems.

While the invention has been described by means of a specific example and in a specific embodiment, I do not wish to be limited thereto, for obvious modifications will occur to those skilled in the art without departing from the spirit and scope of the invention.

I claim:

1. An integrated optical-electronic solid-state system for miniaturizing optical-electronic compound systems primarily comprising combined coacting optical-electronic, electrical, optical and photoelectric components, a compound system comprising a base crystal for integrating optical and electronic operations, said base crystal having a surface, a matrix provided on the surface of said base crystal and defining a spatial integration system and containing the complete function of desired optical-electronic operations, said matrix comprising at least two layers interchangeable with regard to their optical and electronic integrated functions, at least a first of the layers of said matrix being provided at the surface of said base crystal, a second of the layers of said matrix being additionally provided on the surface of said base crystal and at least the first layer of said matrix integrating the electronic component functions of the compound system and impressing electrical current paths and including electronic component regions and optical component systems, and electronic component systems, at least the second layer of said matrix having said optical component systems embedded therein, said first layer of said matrix being functionally subordinated in its cross section to said optical component systems in a manner which produces a reciprocal action between the electronic and optical function elements of the compound system which extend along specific paths and substantially parallel to the surface of said base crystal in at least the first of the layers of said matrix in order to provide an optical coupling between the optical component systems, said optical function elements extending through specific regions of the surface of said base crystal perpendicularly to said matrix in order to produce optical-electronic coupling of the optical component systems with the electronic component systems in accordance with the integration system of said matrix, said integrated optical-electronic solid-state system comprising at least two superimposed circuit planes linked by one of optical and electronic and one of horizontal and vertical connections for permitting in each of the circuit planes and between the circuit planes horizontal, vertical, optical and electronic communication operations via a matrix, said matrix functioning at least partially as a carrier of electrical current paths and optical and electrical elements of the system and having vertical and horizontal recesses formed therein for permitting the penetration of information-carrying light beams in predetermined regions and in predetermined directions, and at least one optically conductive member for transferring light within and parallel to said member in any desired direction.

2. An integrated optical-electronic solid-state system as claimed in claim 1, wherein said base crystal is a monocrystal and integrates all optical and electronic operations.

3. An integrated optical-electronic solid-state system as claimed in claim 1, further comprising an integrated electrical current bridge having photoelectrically controllable conductivity for selectively providing electrical interruptions and connections, said bridge having variable controllable electrical resistance.

4. An integrated optical-electronic solid-state system as claimed in claim 1, further comprising a pair of integrated ohmic current paths having a space therebetween and an integrated electrical current bridge comprising sensitively reacting photoelectric material having photoelectrically controllable conductivity for bridging the space between said current paths and selectively providing electrical interruptions and connections, said bridge having variable controllable electrical resistance, and wherein said optically conductive member has horizontal and vertical optically conductive paths, one of said optically conductive paths ending in the space between said current paths so that light current from the optically conductive path may penetrate the photoelectric material of said electrical current bridge.

5. An integrated optical-electronic solid-state system as claimed in claim 1, further comprising at least one integrated surface layer phototransistor substantially comprising three layers having ground boundaries with defined optical refractory qualities.

6. An integrated optical-electronic solid-state system as claimed in claim 1, wherein said optically conductive member comprises a material having a higher index of refraction than the surrounding material whereby an information-carrying light beam in said optically conductive member remains parallel to the surface of said base crystal.

7. An integrated optical-electronic solid-state system as claimed in claim 1, wherein said base crystal has a lateral boundary and said optically conductive member at least partly comprises optical material for causing an information-carrying light beam to penetrate the lateral boundary of said base crystal at predetermined points and for causing information-carrying light beams to cross said base crystal.

8. An integrated optical-electronic solid-state system as claimed in claim 1, wherein said optically conductive member comprises glass.

9. An integrated optical-electronic solid-state system as claimed in claim 1, wherein said optically conductive member comprises a glasslike substance.

10. An integrated optical-electronic solid-state system as claimed in claim 1, wherein said optically conductive member comprises monocrystalline material.

11. An integrated optical-electronic solid-state system as claimed in claim 1, wherein said optically conductive member is a layer of foreign material provided on said base crystal.

12. An integrated optical-electronic solid-state system as claimed in claim 1, wherein said optically conductive member is in said base crystal.

13. An integrated optical-electronic solid-state system as claimed in claim 1, wherein said optically conductive member is colored in its interior.

14. An integrated optical-electronic solid-state system as claimed in claim 1, wherein said optically conductive member is colored at a surface thereof.

15. An integrated optical-electronic solid-state system as claimed in claim 1, wherein said optically conductive member is at least partly a component of said base crystal.

16. An integrated optical-electronic solid-state system as claimed in claim 1, wherein said optically conductive member is coated with at least partly reflecting thin layers which provide optical paths in said optically conductive member at the surface of said optically conductive member and at at least a lateral edge of said optically conductive member and determine the inputs and outputs of said optically conductive member.

17. An integrated optical-electronic solid-state system as claimed in claim 1, wherein said optically conductive member is coated with fluorescent thin layers which provide optical paths in said optically conductive member at the surface of said optically conductive member and at at least a lateral edge of said optically conductive member and determine the inputs and outputs of said optically conductive member.

18. An integrated optical-electronic solid-state system as claimed in claim 1, wherein said optically conductive member is coated with transparent thin layers which provide optical paths in said optically conductive member at the surface of said optically conductive member and at at least a lateral edge of said optically conductive member and determine the inputs and outputs of said optically conductive member.

19. An integrated optical-electronic solid-state system as claimed in claim 1, wherein said optically conductive member has a spatially variable distribution of the refractory index.

20. An integrated optical-electronic solid-state system as claimed in claim 1, wherein said optically conductive member is double refracting and polarizing.

21. An integrated optical-electronic solid-state system as claimed in claim 1, wherein said optically conductive member comprises at least two adjacent component regions having variable optical characteristics.

22. An integrated optical-electronic solid-state system as claimed in claim 1, wherein said optically conductive member at least partly comprises optically stimulated laser-active material.

23. An integrated optical-electronic solid-state system as claimed in claim 1, wherein said matrix comprises substantially nonconductive material nontransparent to light beams in said integrated system.

24. An integrated optical-electronic solid-state system as claimed in claim 1, wherein the recesses formed in said matrix are filled with transparent material.

24. An integrated optical-electronic solid-state system as claimed in claim 1, wherein the recesses formed in said matrix are filled with transparent material at least partly of other elements of said integrated system.

26. An integrated optical-electronic solid-state system as claimed in claim 1, wherein said matrix comprises the principal spatial and material portion of said integrated system.

27. An integrated optical-electronic solid-state system as claimed in claim 1, further comprising a plurality of base crystals, and wherein said matrix comprises the principal spatial and material portion of said integrated system, said plurality of base crystals being mounted adjacent each other in said matrix.

28. An integrated optical-electronic solid-state system as claimed in claim 1, further comprising a plurality of base crystals, and wherein said matrix comprises the principal spatial and material portion of said integrated system, said plurality of base crystals being mounted adjacent each other on said matrix.

29. An integrated optical-electronic solid-state system as claimed in claim 1, wherein said optically conductive member provides at least one optically conductive path having a controllable index of refraction for regulating a light beam crossing said path.

30. An integrated optical-electronic solid-state system as claimed in claim 1, further comprising a PN-junction having a junction area extending to the optically conductive path and parallel to its longitudinal direction and to the direction of propagation of the light beam for controlling the transparency and the cross section of the optically conductive path.

31. An integrated optical-electronic solid-state system as claimed in claim 1, further comprising a plurality of control members for the controllable optically conductive path, said control members comprising a plurality of predominantly electrical current paths of one of N- and P-conductivity type.

32. An integrated optical-electronic solid-state system as claimed in claim 1, further comprising a PN-junction in the controllable optically conductive path, said PN-junction comprising variable material.

33. An integrated optical-electronic solid-state system as claimed in claim 5, wherein said phototransistor has a horizontal semiconducting base layer forming part of said base crystal.

34. An integrated optical-electronic solid-state system as claimed in claim 5, wherein said phototransistor has a horizontal semiconducting base layer applied as a foreign layer to said base crystal.

35. An integrated optical-electronic solid-state system as claimed in claim 5, wherein said phototransistor has a horizontal semiconducting base layer and an intermediate layer on said base layer and having a photoelectric effect, said intermediate layer having a small angle of inclination forming a transparent optical wedge and extending as an optical conductor path along the system.

36. An integrated optical-electronic solid-state system as claimed in claim 5, wherein said phototransistor has a horizontal semiconducting base layer, an intermediate layer on said base layer, said intermediate layer having a photoelectric effect and a small angle of inclination forming a transparent optical wedge having an upper surface and extending as an optical conductor path along the system and a semiconducting upper layer on the upper surface of said intermediate layer.

37. An integrated optical-electronic solid-state system as claimed in claim 30, wherein one of a direct and alternating voltage is applied to said PN-junction to bias said PN-junction in one of forward and blocking direction for controlling the transparency and the cross section of the optically conductive path and the spectral distribution of the light beam in the optically conductive path.

38. An integrated optical-electronic solid-state system as claimed in claim 37, wherein both a direct and an alternating voltage are applied in superimposed relation to said PN-junction.

* * * * *